(12) United States Patent
Lin et al.

(10) Patent No.: US 12,028,852 B2
(45) Date of Patent: Jul. 2, 2024

(54) DATA TRANSMISSION METHOD AND RELATED APPARATUSES

(71) Applicant: GUANGDONG OPPO MOBILE TELECOMMUNICATIONS CORP., LTD., Guangdong (CN)

(72) Inventors: Xue Lin, Guangdong (CN); Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/476,665

(22) Filed: Sep. 28, 2023

(65) Prior Publication Data
US 2024/0023097 A1  Jan. 18, 2024

Related U.S. Application Data (63) Continuation of application No. PCT/CN2021/098015, filed on Jun. 2, 2021.

(51) Int. Cl.
H04W 72/1268 (2023.01)
H04L 1/1812 (2023.01)
H04W 12/06 (2021.01)
H04W 72/232 (2023.01)

(52) U.S. Cl.
CPC ....... H04W 72/1268 (2013.01); H04L 1/1812 (2013.01); H04W 12/06 (2013.01); H04W 72/232 (2023.01)

(58) Field of Classification Search
CPC ............. H04W 12/06; H04W 72/232; H04W 72/1268; H04L 1/1812

USPC ......................................................... 370/329
See application file for complete search history.

(56) References Cited

U.S. PATENT DOCUMENTS

| 2020/0196349 | A1* | 6/2020 | He ................ H04W 72/1268 |
| 2020/0351936 | A1 | 11/2020 | Kunt | |
| 2022/0322414 | A1* | 10/2022 | Khoshkholgh Dashtaki ............... H04B 7/18513 |
| 2022/0353899 | A1* | 11/2022 | Xiao ..................... H04W 72/23 |
| 2023/0111565 | A1* | 4/2023 | Lee ...................... H04W 72/12 370/329 |
| 2023/0292397 | A1* | 9/2023 | Kung ............... H04W 72/0446 |
| 2023/0379092 | A1* | 11/2023 | Chin .................. H04W 72/232 |
| 2023/0379923 | A1* | 11/2023 | Rastegardoost ...... H04L 1/1819 |

FOREIGN PATENT DOCUMENTS

| CN | 110999489 A | 4/2020 |
| WO | 2021056209 A1 | 4/2021 |

OTHER PUBLICATIONS

ZTE Corporation, Sanechips, Open issues for CG based SDT, 3GPP TSG-RAN WG2 #114-e, R2-2105930, May 11, 2021. (8 pages).

(Continued)

Primary Examiner — Peter G Solinsky
(74) Attorney, Agent, or Firm — Perkins Coie LLP (57) ABSTRACT

A data transmission method and related apparatuses are provided. The method includes the following. A terminal device transmits first uplink data on a first configured grant (CG) resource, where the first uplink data contains first information, and the first information is used for identity authentication of the terminal device. After a first duration elapsed, the terminal device transmits second uplink data on a second CG resource.

14 Claims, 9 Drawing Sheets

(56) References Cited

OTHER PUBLICATIONS

3rd Generation Partnership Project; Technical Specification Group Radio Access Network; NR; Multiplexing and channel coding (Release 16), 3GPP TS 38.212 V16.5.0, Mar. 2021. (152 pages).
3rd Generation Partnership Project; Technical Specification Group Radio Access Network; NR; Radio Resource Control (RRC) protocol specification (Release 15), 3GPP TS 38.331 V15.11.0, Sep. 2020. (541 pages).
Xiaomi Communications, Remaining issues of CG-SDT, 3GPP TSG-RAN WG2 Meeting #114 electronic, R2-2105722, May 11, 2021. (7 pages).
3rd Generation Partnership Project; Technical Specification Group Radio Access Network; NG-RAN; Architecture description (Release 16), 3GPP TS 38.401 V16.4.0, Jan. 2021. (78 pages).
ZTE Corporation, Work Item on NR smalldata transmissions in Inactive state, 3GPP TSG RAN Meeting #91e, RP-210870, Mar. 2021. (5 pages) URL: https://www.3gpp.org/ftp/TSG_RAN/TSG_RAN/TSGR_91e/Docs/RP-210870.zip.
ETSI MCC, Report of 3GPP TSG RAN2#112-e meeting, Online, 3GPP TSG-RAN WG2 meeting #113-e, R2-2100001, Nov. 2020. (370 pages) URL: https://www.3gpp.org/ftp/TSG_RAN/WG2_RL2/TSGR2_113-e/Docs/R2-2100001.zip.
Session Chair (InterDigital), Report for Rel-17 Small data and URLLC/IIoT and Rel-16 NR-U, Power Savings, and 2step RACH, 3GPP TSG-RAN WG2 Meeting #113 electronic, R2-2101954, Feb. 2021. (25 pages) URL: https://www.3gpp.org/ftp/TSG_RAN/WG2_RL2/TSGR2_113-e/Docs/R2-2101954.zip.
NEC, Subsequent data transmission for SDT, 3GPP TSG-RAN WG2 #112 electronic, R2-2009657, Oct. 23, 2020. (3 pages) URL: https://www.3gpp.org/ftp/TSG_RAN/WG2_RL2/TSGR2_112-e/Docs/R2-2009657.zip.
OPPO, Discussion on CG-based SDT, 3GPP TSG-RAN WG2 #112-e, R2-2009015, Oct. 23, 2020. (4 pages) URL: https://www.3gpp.org/ftp/TSG_RAN/WG2_RL2/TSGR2_112-e/Docs/R2-2009015.zip.
WIPO, International Search Report and Written Opinion for International Application No. PCT/CN2021/098015, dated Feb. 18, 2022. (16 pages with translation).
Catt, "Analysis on CG-based SDT", 3GPP TSG-RAN WG2 Meeting #113 electronic Online, R2-2100297, dated Jan. 25-Feb. 5, 2021. 6 pages.
Catt, "Security aspects on SDT", 3GPP TSG-RAN WG2 #112-e Online, R2-2009366, dated Nov. 2-13, 2020. 4 pages.
Email discussion rapporteur (Huawei, HiSilicon), "Remaining untreated proposals from [POST113-e][504][SDT] CG Open Issues", 3GPP RAN WG2 Meeting #114-e E-meeting, R2-2105031, dated May 19-27, 2021. 16 pages.
Extended European search report issued in corresponding European application No. 21943530.2 dated Apr. 4, 2024. 13 pages.

* cited by examiner

FIG. 11

DATA TRANSMISSION METHOD AND RELATED APPARATUSES

CROSS-REFERENCE TO RELATED APPLICATION(S)

This application is a continuation of PCT application No. PCT/CN2021/098015, filed Jun. 2, 2021, the entire disclosure of which is hereby incorporated by reference.

TECHNICAL FIELD

This disclosure relates to the field of communication technology, and more particularly, to a data transmission method and related apparatuses.

BACKGROUND

A resource for uplink data transmission of a terminal device (user equipment (UE)) may be based on dynamic scheduling of a network, or may be a configured grant (CG) resource, where the CG resource is a set of uplink resources that are pre-configured by the network and occur periodically. The UE can perform small data transmission (SDT) in an inactive state, where SDT includes random access (RA)-SDT and CG-SDT.

In an SDT procedure, a radio resource control (RRC) resume request message needs to be included in a $1^{st}$ uplink transmission in order for performing identity authentication on the UE, and subsequent transmission can be performed only after authentication of the UE by the network succeeds. However, with regard to CG-SDT, the UE is likely to transmit the remaining data on a next CG resource before data for the $1^{st}$ uplink transmission transmitted by the UE on a CG resource is received successfully by the network. As a result, subsequent data will be received by the network before the network performs identity authentication on the UE.

SUMMARY

In a first aspect, a data transmission method is provided in the disclosure. The method is applied to a terminal device. The method includes the following. Transmit first uplink data on a first CG resource, where the first uplink data contains first information, and the first information is used for identity authentication of the terminal device. After a first duration elapsed, transmit second uplink data on a second CG resource.

In a second aspect, a data transmission method is provided in the disclosure. The method is applied to a network device. The method includes the following. Receive first uplink data transmitted by a terminal device on a first CG resource, where the first uplink data contains first information, and the first information is used for identity authentication of the terminal device. Receive, after a first duration elapsed, second uplink data transmitted by the terminal device on a second CG resource.

In a third aspect, a terminal device is provided in the disclosure. The terminal device includes a transceiver, a processor, and a memory. The memory stores programs which, when executed by the processor, are operable with the processor to: cause the transceiver to transmit first uplink data on a first CG resource, where the first uplink data contains first information, and the first information is used for identity authentication of the terminal device; cause the transceiver to transmit second uplink data on a second CG resource after a first duration elapsed.

DETAILED DESCRIPTION

The following will describe technical solutions of the disclosure with reference to the accompanying drawings.

Some terms in embodiments of the disclosure will be explained below to facilitate understanding by those skilled in the art.

In embodiments of the disclosure, "at least one" refers to one or more, and "a plurality of" or "multiple" refers to two or more. "And/or" describes an association relationship between associated objects, which means that there may be three relationships. For example, A and/or B can mean A alone, both A and B exist, and B alone, where A and B each may be singular or plural. The character "/" herein generally indicates that the associated objects are in an "or" relationship. "At least one (item) of the following" as well as similar expressions thereof refers to any combination of these items, including any combination of a singular item (one) or a plural item (one). For example, at least one (item) of a, b, or c may mean: a, b, c, a-b, a-c, b-c, or a-b-c, where a, b, and c each may be one or multiple.

In addition, unless stated otherwise, the ordinal number such as "first" and "second" mentioned in embodiments of the disclosure are used for distinguishing multiple objects, rather than defining the order, timing, priority, or importance of the multiple objects. For example, "first information" and "second information" are only intended for differentiating different information, rather than indicating differences between the two types of information in terms of content, priority, sending order, importance, or the like.

In order for better understanding of the disclosure, concepts related to the disclosure will be firstly explained.

Early data transmission (EDT): in long term evolution (LTE), EDT has been introduced. During EDT, a user equipment (UE) may always remain in an idle state, a suspend state, or an inactive state to complete transmission of an uplink small data packet and/or transmission of a downlink small data packet. In terms of configuration, a network configures, on a system information block (SIB), a maximum transport block (TB) size allowed to be transmitted by a current network. The UE determines an amount of data to be transmitted. If the amount of data to be transmitted is less than the maximum TB size allowed to be transmitted, the UE can initiate EDT. If the amount of data to be transmitted is greater than or equal to the maximum TB size allowed to be transmitted, the UE will enter a connected state for data transmission through a conventional connection-establishment procedure.

Figure 1:
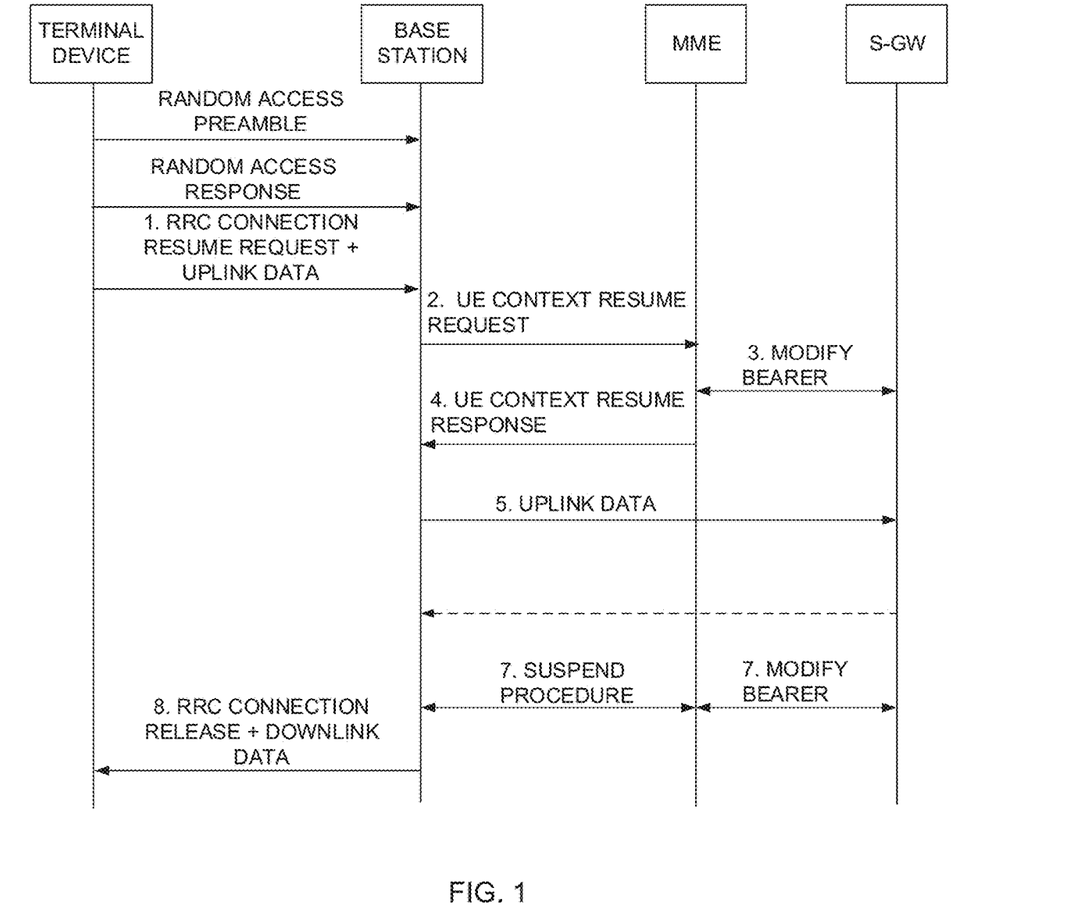
FIG. 1 is a schematic flowchart illustrating early data transmission (EDT).

Referring to FIG. 1, FIG. 1 is a schematic flowchart illustrating EDT. As illustrated in FIG. 1, if a cell in which EDT is initiated by the UE is the same as the last serving cell, a base station can directly deliver uplink data to a core network after receiving a connection resume request and the uplink data transmitted by the UE.

Figure 2:
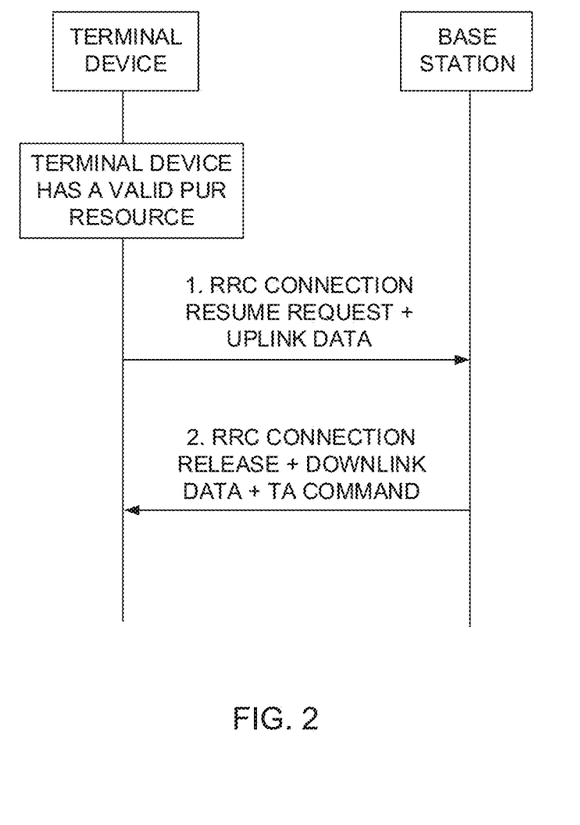
FIG. 2 is a schematic flowchart illustrating preconfigured uplink resource (PUR) transmission.

Preconfigured uplink resource (PUR): for a narrow-band Internet of things (NB-IoT) scenario and an enhanced machine type communication (eMTC) scenario, a method for data transmission on a PUR resource in an idle state is introduced. A PUR resource is valid only in a currently configured cell, that is, if cell change is detected by the UE and random access is initiated in a new cell by the UE, the UE needs to release the PUR resource configured for the original cell. Referring to FIG. 2, FIG. 2 is a schematic flowchart illustrating PUR transmission.

Configured grant (CG): a resource for uplink data transmission of the UE may be based on dynamic scheduling (indicated by downlink control information (DCI)) of the network, or may be a CG resource. The CG resource is a set of uplink resources that are pre-configured by the network and occur periodically. An uplink CG resources may be classified into two types, namely type 1 and type 2.

CG type 1 is configured via a radio resource control (RRC) parameter, and includes parameters such as a time-domain resource, a frequency-domain resource, a demodulation reference signal (DMRS), an open-loop power control, a modulation and coding scheme (MCS), a waveform, a redundancy version, the number of repetitions, frequency modulation, and a hybrid automatic repeat request (HARQ) process. The UE can perform uplink data transmission over the configured CG type 1 resource after receiving a higher-layer configuration, and there is no need for an additional activation step.

CG type 2 is also configured via an RRC parameter, but activation of the configured CG type 2 resource is indicated by DCI scrambled by a configured scheduling radio network temporary identifier (CS-RNTI), and a transmission resource and transmission parameter including a time-domain resource, a frequency-domain resource, a DMRS, an MCS, etc. are also configured. The UE cannot use the CG type 2 resource immediately after receiving a higher-layer configuration, but can perform uplink data transmission only after receiving the corresponding DCI activation indication and configuration information.

The UE determines, according to a network configuration, a HARQ process corresponding to a CG resource. After completing uplink data transmission on a CG resource corresponding to a certain HARQ process, the UE starts a timer. Before expiry of the timer, the UE cannot transmit new data on a CG resource corresponding to the same HARQ process, so as to avoid data in a HARQ buffer from being overwritten by other data. After the timer expires, it indicates that data transmitted via the corresponding HARQ process is received successfully by the network.

Small data transmission (SDT): in a 5th generation (5G) new radio (NR) system, an RRC state is classified into three types, namely an RRC idle state, an RRC inactive state, and an RRC connected state. The RRC inactive state is a new state introduced into a 5G system for the sake of power saving. For a UE in the RRC inactive state, a radio bearer and all radio resources are released, but an access context of the UE is reserved at a UE side and a base-station side so as to facilitate quick resume of RRC connection. The network usually keeps a UE, which does not frequently perform data transmission, to be in the RRC inactive state.

Before release 16 (Rel-16), a UE in the RRC inactive state does not support data transmission. When mobile original (MO) data or mobile terminated (MT) data arrives, the UE needs to resume a connection, and then is released to the RRC inactive state after data transmission is completed. For a UE that has a small data amount and performs transmission infrequently, if the above transmission mechanism is adopted, it will cause unnecessary power consumption and signaling overhead. To this end, in release 17 (Rel-17), SDT in the RRC inactive state is introduced, where SDT includes random access (RA)-SDT and CG (for example, CG type 1)-SDT.

For the two schemes of RA-SDT and CG-SDT, a common control channel (CCCH) message needs to be included in the $1^{st}$ uplink transmission, where the CCCH message may be an existing RRC resume request message.

SDT also supports subsequent transmission, that is, after completing the $1^{st}$ uplink data transmission, the UE can remain in the inactive state for uplink data transmission or downlink data reception. For CG-SDT, subsequent transmission may be based on dynamic scheduling of the network, or may be CG-based.

The RRC resume request message contains an inactive radio network temporary identifier (I-RNTI), a resume media access control identifier (resume MAC-I), and a resume cause. The I-RNTI is a UE identity that is used for a base station to search for the UE context according to the I-RNTI. The resume MAC-I is used for the base station to perform identity authentication on the UE. The resume cause indicates a reason for which the UE initiates a connection request.

In an SDT procedure, the RRC resume request message needs to be included in the $1^{st}$ uplink transmission in order for the base station to determine an identity of the UE, search for the access context of the UE, and authenticate the identity of the UE. Subsequent transmission can be performed only after authentication of the UE by the network succeeds.

For CG-SDT, a resource for the $1^{st}$ uplink data transmission is a CG resource. A resource for subsequent data transmission may be a CG resource, or may be a resource based on dynamic scheduling. The UE is likely to transmit the remaining data on a next CG resource before data for the $1^{st}$ uplink transmission transmitted by the UE on a CG resource is received successfully by the network. As a result, subsequent data will be received by the network before the network performs identity authentication on the UE.

The related art of the disclosure has been described above, and the technical features of embodiments of the disclosure will be described below.

The disclosure provides a data transmission method and related apparatuses, which can avoid receiving subsequent data by a network before performing identity authentication on a user equipment (UE) during configured grant (CG)-small data transmission (SDT).

Figure 3:
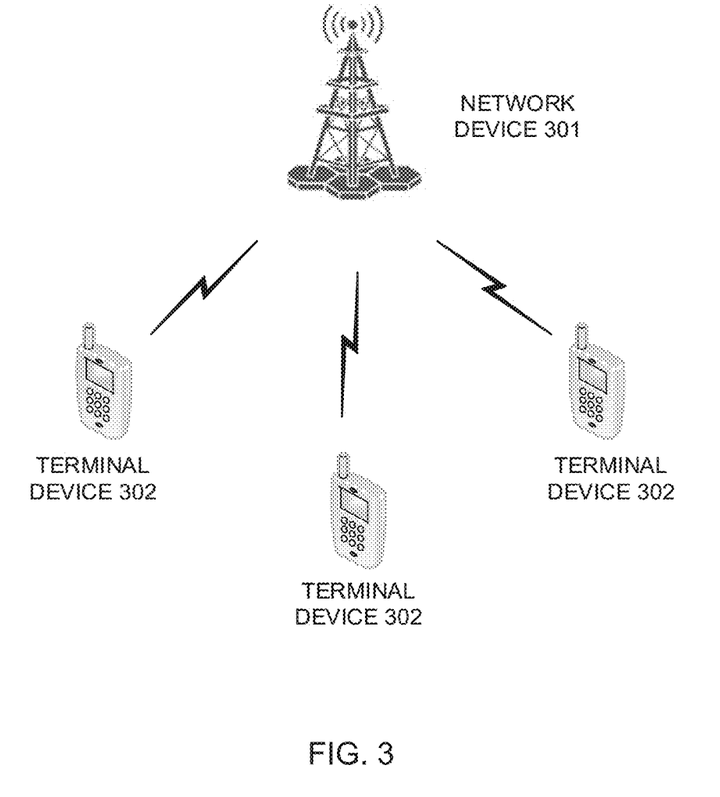
FIG. 3 is a schematic diagram of a communication system to which embodiments of the disclosure are applicable.

Referring to FIG. 3, FIG. 3 is a schematic diagram of a communication system to which embodiments of the disclosure are applicable. As illustrated in FIG. 3, the communication system includes a network device 301 and a terminal device 302. The terminal device 302 in an RRC inactive state performs CG-SDT if a first condition is satisfied. The first condition includes: all data to be transmitted comes from a radio bearer that allows to trigger SDT; the amount of data to be transmitted is less than or equal to a data amount threshold configured by the network device 301; a downlink reference signal received power (RSRP) measurement result is greater than or equal to an RSRP threshold for performing SDT; a carrier and a synchronization signal block (SSB) selected have a CG resource; and information such as valid timing advance (TA) and valid next hop chaining count (NCC) exists. The terminal device 302 transmits first uplink data on a first CG resource, where the first uplink data contains first information, and the first information is used for identity authentication of the terminal device 302. After a first duration elapsed, the terminal device 302 transmits second uplink data on a second CG resource. As can be seen, the terminal device 302 transmits the first uplink data on the first CG resource, and then, the terminal device 302 transmits the second uplink data on the second CG resource after the first duration elapsed. By setting the first duration, it is possible to ensure that the terminal device 302 can transmit the second uplink data only after the network device 301 performs identity authentication on the terminal device 302, thereby avoiding receiving subsequent data by a network before performing identity authentication on a UE during CG-SDT.

Figure 4:
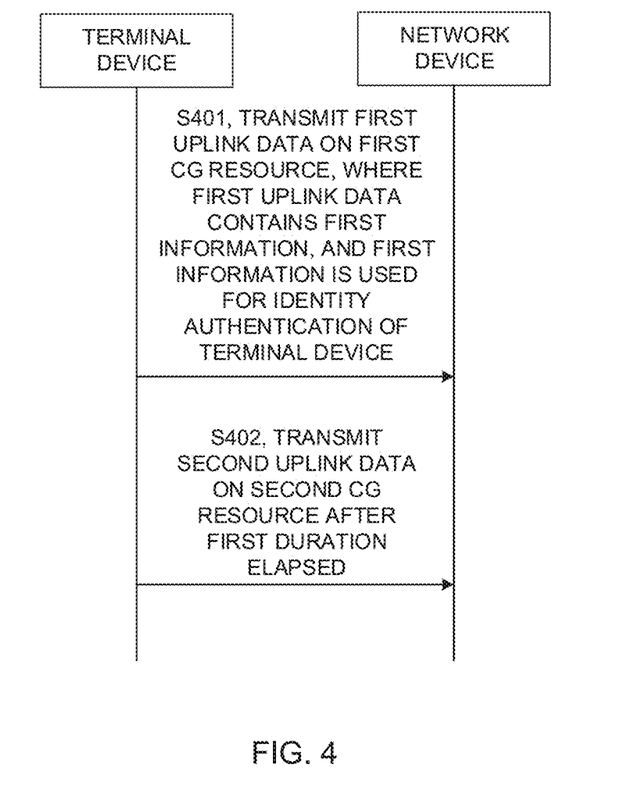
FIG. 4 is a schematic diagram of a data transmission method provided in embodiments of the disclosure.

Referring to FIG. 4, FIG. 4 is a schematic diagram of a data transmission method provided in embodiments of the disclosure. The method may be applied to the communication system illustrated in FIG. 3. As illustrated in FIG. 4, the method includes the following.

S401, a terminal device transmits first uplink data on a first CG resource, where the first uplink data contains first information, and the first information is used for identity authentication of the terminal device.

Optionally, the terminal device in an RRC inactive state performs CG-SDT if a first condition is satisfied. The first condition includes: all data to be transmitted comes from a radio bearer that allows to trigger SDT; the amount of data to be transmitted is less than or equal to a data amount threshold configured by a network device; a downlink RSRP measurement result is greater than or equal to an RSRP threshold for performing SDT; a carrier and an SSB selected have a CG resource; and information such as valid TA and valid NCC exists.

Optionally, the first uplink data includes an RRC message, where the RRC message may be an RRC resume request message, and the first information is carried in the RRC resume request message.

Optionally, after the terminal device transmits the first uplink data on the first CG resource, the method further includes starting a first timer.

Optionally, while first timer is running, the terminal device monitors a first DCI scrambled by a first RNTI, where the first DCI indicates that the terminal device is to retransmit the first uplink data. If the first DCI is received, the terminal device retransmits the first uplink data. After retransmitting the first uplink data, the terminal device restarts the first timer.

In a possible implementation, the terminal device retransmits the first uplink data as follows. The terminal device retransmits the first uplink data on a third CG resource while the first timer is running, where a HARQ process corresponding to the third CG resource is the same as a HARQ process corresponding to the first CG resource. Alternatively, the terminal device retransmits the first uplink data on the third CG resource after expiry of a second timer and while the first timer is running, and then, the terminal device restarts the second timer after retransmitting the first uplink data.

S402, the terminal device transmits second uplink data on a second CG resource after a first duration elapsed.

In this way, by setting the first duration, it is possible to ensure that the terminal device can transmit the second uplink data only after a network performs identity authentication on the terminal device, thereby avoiding receiving subsequent data by the network before performing identity authentication on a UE during CG-small data transmission (SDT).

In the foregoing method, the terminal device transmits the first uplink data on the first CG resource, and then, the terminal device transmits the second uplink data on the second CG resource after the first duration elapsed. By setting the first duration, it is possible to ensure that the terminal device can transmit the second uplink data only after the network device performs identity authentication on the terminal device, thereby avoiding receiving subsequent data by a network before performing identity authentication on a UE during CG-SDT.

Figure 5:
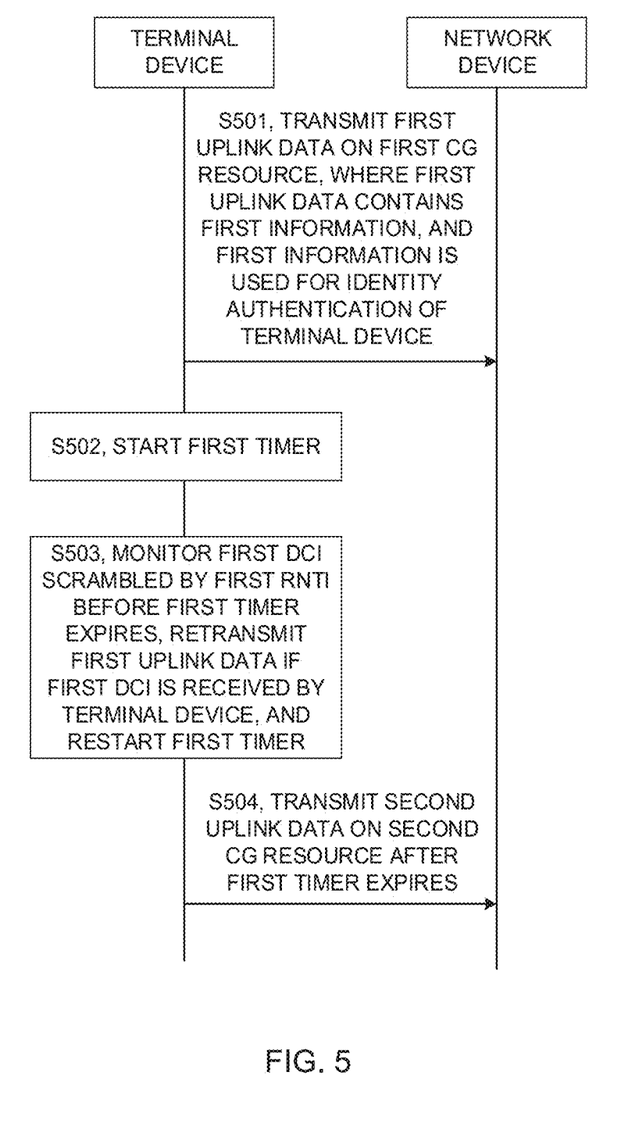
FIG. 5 is a schematic diagram of another data transmission method provided in embodiments of the disclosure.

Referring to FIG. 5, FIG. 5 is a schematic diagram of another data transmission method provided in embodiments of the disclosure. The method may be applied to the communication system illustrated in FIG. 3. As illustrated in FIG. 5, the method includes the following.

S501, a terminal device transmits first uplink data on a first CG resource, where the first uplink data contains first information, and the first information is used for identity authentication of the terminal device.

Specifically, the terminal device in an RRC inactive state performs CG-SDT if a first condition is satisfied. The first condition includes: all data to be transmitted comes from a radio bearer that allows to trigger SDT; the amount of data to be transmitted is less than or equal to a data amount threshold configured by a network device; a downlink RSRP measurement result is greater than or equal to an RSRP threshold for performing SDT, a carrier and an SSB selected have a CG resource; and information such as valid TA and valid NCC exists.

Optionally, the first uplink data includes an RRC message, where the RRC message may be an RRC resume request message, and the first information is carried in the RRC resume request message.

S502, the terminal device starts a first timer.

Specifically, after transmitting the first uplink data, the terminal device starts the first timer. While the first timer is running, the terminal device does not use a CG resource, which corresponds to the same HARQ process as the first CG resource, to transmit new data; nor does the terminal device use a CG resource, which corresponds to a different HARQ process from the first CG resource, to transmit new data.

S503, while the first timer is running, the terminal device monitors first DCI scrambled by a first RNTI. The terminal device retransmits the first uplink data if the first DCI is received by the terminal device, and then the terminal device restarts the first timer.

Specifically, while the first timer is running, the terminal device monitors the first DCI scrambled with the first RNTI by the network device, where the first DCI indicates that the terminal device is to retransmit the first uplink data. If the first DCI is received by the terminal device, the terminal device retransmits the first uplink data. After retransmitting the first uplink data, the terminal device restarts the first timer.

In a possible implementation, the terminal device retransmits the first uplink data as follows. The terminal device retransmits the first uplink data on a third CG resource while the first timer is running, where a HARQ process corresponding to the third CG resource is the same as a HARQ process corresponding to the first CG resource. Alternatively, the terminal device retransmits the first uplink data on the third CG resource after expiry of a second timer and while the first timer is running, and then, the terminal device restarts the second timer after retransmitting the first uplink data.

S504, the terminal device transmits second uplink data on a second CG resource after the first timer expires.

Specifically, after the first timer expires, the terminal device transmits the second uplink data on the second CG resource, where a HARQ process corresponding to the second CG resource is the same as or different from a HARQ process corresponding to the first CG resource.

In the foregoing method, the terminal device transmits the first uplink data on the first CG resource, where the first uplink data contains the first information, and the first information is used for identity authentication of the terminal device. After transmitting the first uplink data, the terminal device starts the first timer. After the first timer expires, the terminal device transmits the second uplink data on the second CG resource. As can be seen, by setting the first timer, it is possible to ensure that the network device receives the first uplink data successfully so as to perform identity authentication on the terminal device, and the terminal device can transmit the second uplink data only after the first timer expires, thereby avoiding receiving subsequent data by a network before performing identity authentication on a UE during CG-SDT.

Figure 6:
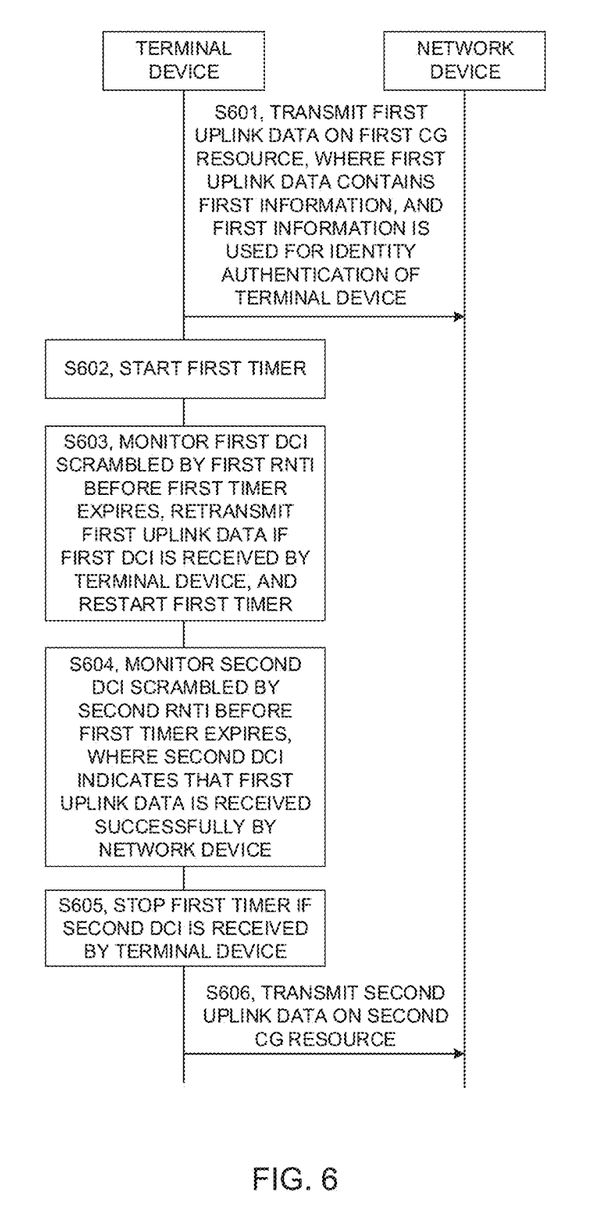
FIG. 6 is a schematic diagram of another data transmission method provided in embodiments of the disclosure.

Referring to FIG. 6, FIG. 6 is a schematic diagram of another data transmission method provided in embodiments of the disclosure. The method may be applied to the communication system illustrated in FIG. 3. As illustrated in FIG. 6, the method includes the following.

S601, a terminal device transmits first uplink data on a first CG resource, where the first uplink data contains first information, and the first information is used for identity authentication of the terminal device.

Specifically, the terminal device in an RRC inactive state performs CG-SDT if a first condition is satisfied. The first condition includes: all data to be transmitted comes from a radio bearer that allows to trigger SDT; the amount of data to be transmitted is less than or equal to a data amount threshold configured by a network device; a downlink RSRP measurement result is greater than or equal to an RSRP threshold for performing SDT, a carrier and an SSB selected have a CG resource; and information such as valid TA and valid NCC exists.

Optionally, the first uplink data includes an RRC message, where the RRC message may be an RRC resume request message, and the first information is carried in the RRC resume request message.

S602, the terminal device starts a first timer.

Specifically, after transmitting the first uplink data, the terminal device starts the first timer. While the first timer is running, the terminal device does not use a CG resource, which corresponds to the same HARQ process as the first CG resource, to transmit new data; nor does the terminal device use a CG resource, which corresponds to a different HARQ process from the first CG resource, to transmit new data.

S603, while the first timer is running, the terminal device monitors first DCI scrambled by a first RNTI. The terminal device retransmits the first uplink data if the first DCI is received by the terminal device, and then the terminal device restarts the first timer.

Specifically, while the first timer is running, the terminal device monitors the first DCI scrambled with the first RNTI by the network device, where the first DCI indicates that the terminal device is to retransmit the first uplink data. If the first DCI is received by the terminal device, the terminal device retransmits the first uplink data. After retransmitting the first uplink data, the terminal device restarts the first timer.

In a possible implementation, the terminal device retransmits the first uplink data as follows. The terminal device retransmits the first uplink data on a third CG resource while the first timer is running, where a HARQ process corresponding to the third CG resource is the same as a HARQ process corresponding to the first CG resource. Alternatively, the terminal device retransmits the first uplink data on the third CG resource after expiry of a second timer and while the first timer is running, and then, the terminal device restarts the second timer after retransmitting the first uplink data.

S604, while the first timer is running, the terminal device monitors second DCI scrambled by a second RNTI, where the second DCI indicates that the first uplink data is received successfully by the network device.

Specifically, the second RNTI may be the same as or different from the first RNTI.

S605, if the second DCI is received by the terminal device, the terminal device stops the first timer.

S606, the terminal device transmits second uplink data on a second CG resource.

Specifically, a HARQ process corresponding to the second CG resource is the same as or different from a HARQ process corresponding to the first CG resource.

In the foregoing method, the terminal device transmits the first uplink data on the first CG resource, where the first uplink data contains first information, and the first information is used for identity authentication of the terminal device. After transmitting the first uplink data, the terminal device starts the first timer. The terminal device stops the first timer after receiving DCI indicating that the first uplink data is received successfully by the network device, and then the terminal device transmits the second uplink data on the second CG resource. As can be seen, by setting the first timer, it is possible to ensure that the network device receives the first uplink data successfully so as to perform identity authentication on the terminal device, and the terminal device can transmit the second uplink data only after the first timer is stopped, thereby avoiding receiving subsequent data by a network before performing identity authentication on a UE during CG-SDT.

Figure 7:
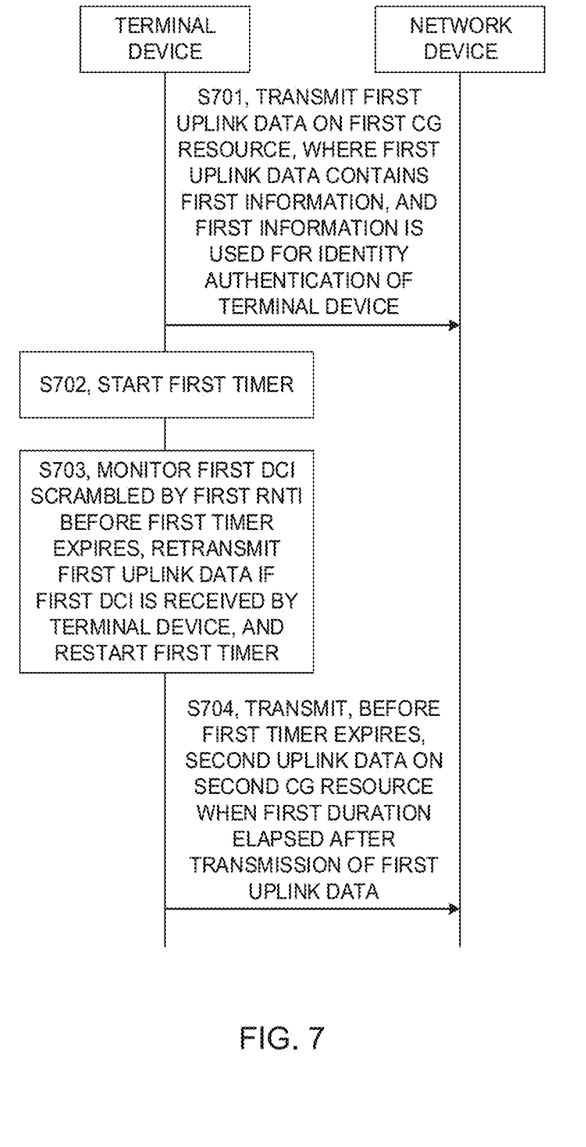
FIG. 7 is a schematic diagram of another data transmission method provided in embodiments of the disclosure.

Referring to FIG. 7, FIG. 7 is a schematic diagram of another data transmission method provided in embodiments of the disclosure. The method may be applied to the communication system illustrated in FIG. 3. As illustrated in FIG. 7, the method includes the following.

S701, a terminal device transmits first uplink data on a first CG resource, where the first uplink data contains first information, and the first information is used for identity authentication of the terminal device.

Specifically, the terminal device in an RRC inactive state performs CG-SDT if a first condition is satisfied. The first condition includes: all data to be transmitted comes from a radio bearer that allows to trigger SDT; the amount of data to be transmitted is less than or equal to a data amount threshold configured by a network device; a downlink RSRP measurement result is greater than or equal to an RSRP threshold for performing SDT, a carrier and an SSB selected have a CG resource; and information such as valid TA and valid NCC exists.

Optionally, the first uplink data includes an RRC message, where the RRC message may be an RRC resume request message, and the first information is carried in the RRC resume request message.

S702, the terminal device starts a first timer.

Specifically, after transmitting the first uplink data, the terminal device starts the first timer. While the first timer is running, the terminal device does not use a CG resource, which corresponds to the same HARQ process as the first CG resource, to transmit new data.

S703, while the first timer is running, the terminal device monitors first DCI scrambled by a first RNTI. The terminal device retransmits the first uplink data if the first DCI is received by the terminal device, and then the terminal device restarts the first timer.

Specifically, while the first timer is running, the terminal device monitors the first DCI scrambled with the first RNTI by the network device, where the first DCI indicates that the terminal device is to retransmit the first uplink data. If the first DCI is received by the terminal device, the terminal device retransmits the first uplink data. After retransmitting the first uplink data, the terminal device restarts the first timer.

In a possible implementation, the terminal device retransmits the first uplink data as follows. The terminal device retransmits the first uplink data on a third CG resource while the first timer is running, where a HARQ process corresponding to the third CG resource is the same as a HARQ process corresponding to the first CG resource. Alternatively, the terminal device retransmits the first uplink data on the third CG resource after expiry of a second timer and while the first timer is running, and then, the terminal device restarts the second timer after retransmitting the first uplink data.

S704, while the first timer is running, the terminal device transmits second uplink data on a second CG resource when a first duration elapsed after transmission of the first uplink data.

Specifically, while the first timer is running, if the second CG resource exists (where a HARQ process corresponding to the second CG resource is different from a HARQ process corresponding to the first CG resource) and the terminal device has the second uplink data to be transmitted, the terminal device transmits the second uplink data on the second CG resource. The second uplink data contains the first information, and the first information may be carried in a MAC control element (CE) or an RRC message. The first information includes a resume MAC-I. The first duration is a time interval between the first CG resource and the second CG resource, that is, the first duration is a time interval from when the first uplink data is transmitted by the terminal device to occurrence of the second CG resource.

In the foregoing method, the terminal device transmits the first uplink data on the first CG resource, where the first uplink data contains the first information, and the first information is used for identity authentication of the terminal device. After transmitting the first uplink data, the terminal device starts the first timer. While the first timer is running, the terminal device transmits the second uplink data on the second CG resource, where the second uplink data contains the first information. As can be seen, while the first timer is running, the terminal device also carries the first information in new data when transmitting the new data on a CG resource corresponding to another HARQ process. In this way, no matter whether the network device has received the first uplink data successfully, the network device can perform identity authentication on the terminal device according to the received second uplink data after the terminal device transmits the second uplink data to the network device, thereby avoiding receiving subsequent data by a network before performing identity authentication on a UE during CG-SDT.

The data transmission method provided in embodiments of the disclosure has been described above. The following will describe a data transmission apparatus provided in embodiments of the disclosure.

Figure 8:
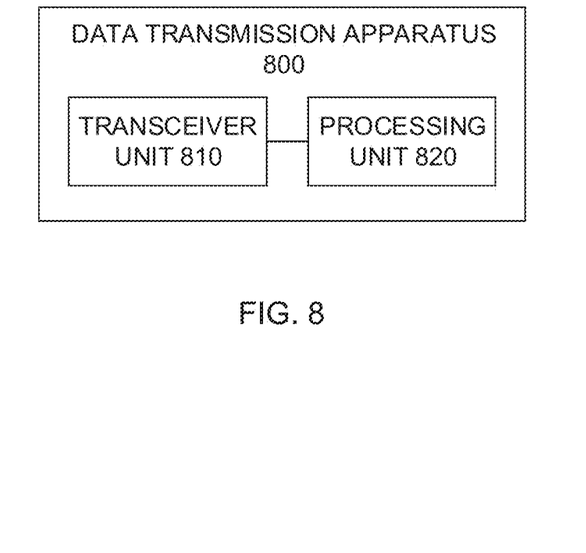
FIG. 8 is a schematic diagram of a data transmission apparatus provided in embodiments of the disclosure.

Referring to FIG. 8, FIG. 8 is a schematic diagram of a data transmission apparatus provided in embodiments of the disclosure. The apparatus 800 is applied to a terminal device. The apparatus 800 includes a transceiver unit 810 and a processing unit 820. The apparatus 800 may be a terminal device, or may be a chip or an integrated circuit inside the terminal device. The transceiver unit 810 is configured to transmit first uplink data on a first CG resource, where the first uplink data contains first information, and the first information is used for identity authentication of the terminal device. The transceiver unit 810 is configured to transmit second uplink data on a second CG resource after a first duration elapsed.

In embodiments of the disclosure, the terminal device transmits the first uplink data on the first CG resource, and then, the terminal device transmits the second uplink data on the second CG resource after the first duration elapsed. By setting the first duration, it is possible to ensure that the terminal device can transmit the second uplink data only after a network performs identity authentication on the terminal device, thereby avoiding receiving subsequent data by the network before performing identity authentication on a UE during CG-SDT.

Optionally, as an embodiment, the processing unit 820 is configured to start a first timer.

Optionally, as an embodiment, the transceiver unit 810 is further configured to monitor DCI scrambled by a first RNTI while the first timer is running, and retransmit the first uplink data if the first DCI is received, where the first DCI indicates that the terminal device is to retransmit the first uplink data. The processing unit 820 is further configured to restart the first timer after retransmission of the first uplink data.

Optionally, as an embodiment, in terms of retransmitting the first uplink data, the transceiver unit 810 is specifically configured to retransmit the first uplink data on a third CG resource while the first timer is running, or retransmit the first uplink data on the third CG resource after expiry of a second timer and while the first timer is running, where a HARQ process corresponding to the third CG resource is the same as a HARQ process corresponding to the first CG resource.

Optionally, as an embodiment, in terms of retransmitting the second uplink data on the second CG resource after the first duration elapsed, the transceiver unit 810 is specifically configured to transmit the second uplink data on the second CG resource after the first timer expires, where the first duration is a duration for which the first timer is in a running state.

Optionally, as an embodiment, in terms of retransmitting the second uplink data on the second CG resource after the first duration elapsed, the transceiver unit 810 is specifically configured to monitor second DCI scrambled by a second RNTI while the first timer is running, where the second DCI indicates that the first uplink data is received successfully by a network device. The transceiver unit 810 is specifically configured to stop the first timer if the second DCI is received, and transmit the second uplink data on the second CG resource, where the first duration is a duration for which the first timer is in a running state.

Optionally, as an embodiment, in terms of retransmitting the second uplink data on the second CG resource after the first duration elapsed, the transceiver unit 810 is specifically configured to: while the first timer is running, transmit the second uplink data on the second CG resource when the first duration elapsed after transmission of the first uplink data, where the second uplink data contains the first information, a HARQ process corresponding to the second CG resource is different from a HARQ process corresponding to the first CG resource, and the first duration is a time interval between the first CG resource and the second CG resource.

It should be understood that, the transceiver unit 810 in embodiments of the disclosure may be implemented by a transceiver or a transceiver-related circuit assembly, and the processing unit 820 may be implemented by a processor or a processor-related circuit assembly.

Figure 9:
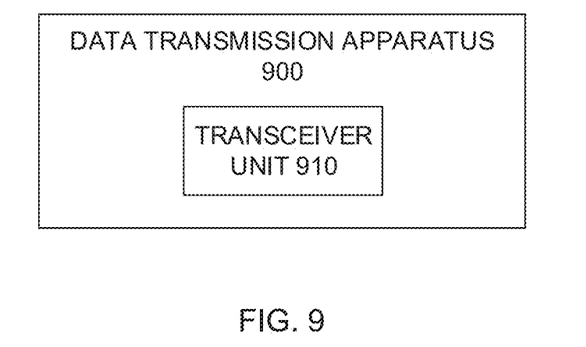
FIG. 9 is a schematic diagram of another data transmission apparatus provided in embodiments of the disclosure.

Referring to FIG. 9, FIG. 9 is a schematic diagram of another data transmission apparatus provided in embodiments of the disclosure. The apparatus 900 is applied to a network device. The apparatus 900 includes a transceiver unit 910. The apparatus 900 may be a network device, or may be a chip or an integrated circuit inside the network device. The transceiver unit 910 is configured to receive first uplink data transmitted by a terminal device on a first CG resource, where the first uplink data contains first information, and the first information is used for identity authentication of the terminal device. The transceiver unit 910 is configured to receive second uplink data transmitted by the terminal device on a second CG resource after a first duration elapsed.

In the embodiments of the disclosure, the network device receives the first uplink data transmitted by the terminal device on the first CG resource, and after the first duration elapsed, the network device receives the second uplink data transmitted by the terminal device on the second CG resource. By setting the first duration, it is possible to ensure that a network can receive the second uplink data transmitted by the terminal device only after performing identity authentication on the terminal device, thereby avoiding receiving subsequent data by the network before performing identity authentication on a UE during CG-SDT.

Optionally, as an embodiment, the transceiver unit 910 is further configured to transmit to the terminal device first DCI scrambled by a first RNTI while a first timer for the terminal device is running, where the first DCI indicates that the terminal device is to retransmit the first uplink data. The transceiver unit 910 is further configured to receive the first uplink data retransmitted by the terminal device.

Optionally, as an embodiment, in terms of receiving the first uplink data retransmitted by the terminal device, the transceiver unit 910 is specifically configured to: while the first timer is running, receive the first uplink data retransmitted by the terminal device on a third CG resource; or after expiry of a second timer for the terminal device and while the first timer is running, receive the first uplink data retransmitted by the terminal device on the third CG resource, where a HARQ process corresponding to the third CG resource is the same as a HARQ process corresponding to the first CG resource.

Optionally, as an embodiment, in terms of receiving, after the first duration elapsed, the second uplink data transmitted by the terminal device on the second CG resource, the transceiver unit 910 is specifically configured to: after the first timer expires, receive the second uplink data transmitted by the terminal device on the second CG resource, where the first duration is a duration for which the first timer is in a running state.

Optionally, as an embodiment, in terms of receiving, after the first duration elapsed, the second uplink data transmitted by the terminal device on the second CG resource, the transceiver unit 910 is specifically configured to: while the first timer is running, transmit to the terminal device second DCI scrambled by a second RNTI, where the second DCI indicates that the first uplink data is received successfully by the network device. The transceiver unit 910 is specifically configured to receive the second uplink data transmitted by the terminal device on the second CG resource, where the first duration is a duration for which the first timer is in a running state.

Optionally, as an embodiment, in terms of receiving, after the first duration elapsed, the second uplink data transmitted by the terminal device on the second CG resource, the transceiver unit 910 is specifically configured to: while the first timer is running, receive the second uplink data transmitted by the terminal device on the second CG resource when the first duration elapsed after transmission of the first uplink data, where the second uplink data contains the first information, a HARQ process corresponding to the second CG resource is different from a HARQ process corresponding to the first CG resource, and the first duration is a time interval between the first CG resource and the second CG resource.

It should be understood that, the transceiver unit 910 in embodiments of the disclosure may be implemented by a transceiver or a transceiver-related circuit assembly.

Figure 10:
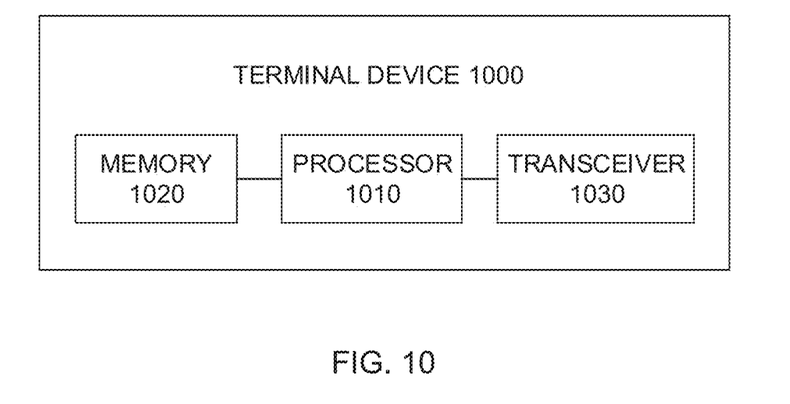
FIG. 10 is a schematic diagram of a terminal device provided in embodiments of the disclosure.

Referring to FIG. 10, FIG. 10 is a schematic diagram of a terminal device provided in embodiments of the disclosure. The terminal device 1000 includes a processor 1010, a memory 1020, and a transceiver 1030. The memory 1020 is configured to store instructions or programs. The processor 1010 is configured to execute the instructions or programs stored in the memory 1020. The instructions or programs stored in the memory 1020, when executed, are operable with the processor 1010 to implement operations executed by the processing unit 820 in the foregoing embodiments, and are operable with the transceiver 1030 to implement operations executed by the transceiver unit 810 in the foregoing embodiments.

It should be understood that, the data transmission apparatus 800 in embodiments of the disclosure may correspond to the terminal device in the data transmission method in embodiments of the disclosure, and operations and/or functions of units in the data transmission apparatus 800 or the terminal device 1000 are respectively intended for implementing corresponding operations in the methods in FIG. 4 to FIG. 7, which will not be described in detail again herein for the sake of brevity.

Figure 11:
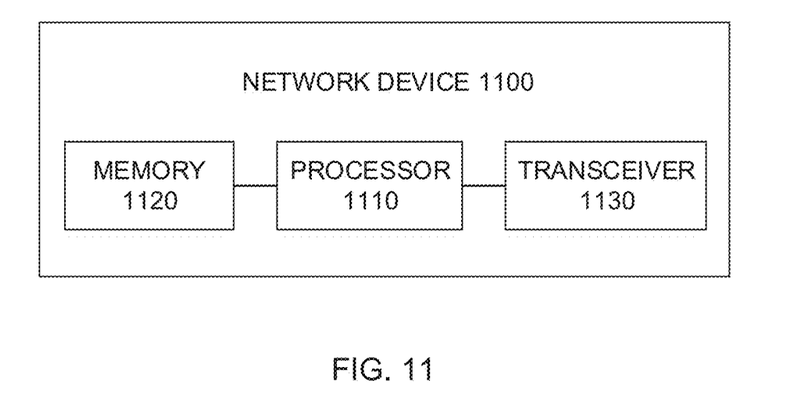
FIG. 11 is a schematic diagram of a network device provided in embodiments of the disclosure.

Referring to FIG. 11, FIG. 11 is a schematic diagram of a network device provided in embodiments of the disclosure. The network device 1100 includes a processor 1110, a memory 1120, and a transceiver 1130. The memory 1120 is configured to store instructions or programs. The processor 1110 is configured to execute the instructions or programs stored in the memory 1120. The instructions or programs stored in the memory 1120, when executed, are operable with the transceiver 1130 to implement operations executed by the transceiver unit 910 in the foregoing embodiments.

It should be understood that, the data transmission apparatus 900 in embodiments of the disclosure may correspond to the network device in the data transmission method in embodiments of the disclosure, and operations and/or functions of various units in the data transmission apparatus 900 or the network device 1100 are respectively intended for implementing corresponding operations in the methods in FIG. 4 to FIG. 7, which will not be described in detail again herein for the sake of brevity.

Embodiments of the disclosure further provide a computer-readable storage medium. The computer-readable storage medium is configured to store computer programs which, when executed by a processor, are operable to implement operations related to the terminal device in the foregoing method embodiments.

Embodiments of the disclosure further provide a computer-readable storage medium. The computer-readable storage medium is configured to store computer programs which, when executed by a processor, are operable to implement operations related to the network device in the foregoing method embodiments.

Embodiments of the disclosure further provide a system-on-chip (SOC). The SOC includes a communication interface and a processor. Optionally, the SOC further includes a memory. The memory is configured to store computer programs which, when executed by the processor, are operable to implement one or more steps in the foregoing method embodiments.

Embodiments of the disclosure further provide a computer program product. The computer program product includes program instructions which, when executed by a computer or a processor, are operable with the computer or the processor to implement one or more steps in the foregoing method embodiments. If various modules of the devices described above implemented as software functional units and sold or used as standalone products, they may be stored in a computer-readable storage medium.

It should be noted that, the memory described herein is intended to include, but is not limited to, these and any other suitable type of memory.

It should be understood that, in various embodiments of the disclosure, the magnitude of a sequence number of each of the foregoing processes does not imply an execution order, and the execution order between the processes should be determined according to function and internal logic thereof, which shall not constitute any limitation to the implementation of embodiments of the disclosure.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and brevity, in terms of the specific working processes of the foregoing systems, apparatuses, and units, reference can be made to the corresponding processes in the foregoing method embodiments, which will not be described in detail again herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure. In addition, various functional units described in various embodiments of the disclosure may be integrated into one processing unit or may be present as a number of physically separated units, or two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computer device, e.g., a personal computer, a server, a network device, etc., to execute some or all operations of the methods described in various embodiments of the disclosure. The above storage medium may include various kinds of media that can store program codes, such as a universal serial bus (USB) flash disk, a mobile hard drive, a read-only memory (ROM), a random-access memory (RAM), a magnetic disk, or an optical disk.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

We claim:

1. A data transmission method, applied to a terminal device and comprising:
   transmitting first uplink data on a first configured grant (CG) resource, wherein the first uplink data contains first information, and the first information is used for identity authentication of the terminal device; and
   starting a first timer;
   while the first timer is running, transmitting second uplink data on a second CG resource when a first duration elapsed after transmission of the first uplink data, wherein the second uplink data contains the first information, a HARQ process corresponding to the second CG resource is different from a HARQ process corresponding to the first CG resource, and the first duration is a time interval between the first CG resource and the second CG resource.

2. The method of claim 1, further comprising:
while the first timer is running, monitoring first downlink control information (DCI) scrambled by a first radio network temporary identifier (RNTI), wherein the first DCI indicates that the terminal device is to retransmit the first uplink data;
retransmitting the first uplink data in response to receiving the first DCI; and
restarting the first timer after retransmitting the first uplink data.

3. The method of claim 2, wherein retransmitting the first uplink data comprises:
retransmitting the first uplink data on a third CG resource while the first timer is running, or retransmitting the first uplink data on the third CG resource after expiry of a second timer and while the first timer is running, wherein a hybrid automatic repeat request (HARQ) process corresponding to the third CG resource is the same as a HARQ process corresponding to the first CG resource.

4. The method of claim 1, wherein transmitting the second uplink data on the second CG resource after the first duration elapsed comprises:
while the first timer is running, monitoring second DCI scrambled by a second RNTI, wherein the second DCI indicates that the first uplink data is received successfully by a network device; and
stopping the first timer in response to receiving the second DCI, and transmitting the second uplink data on the second CG resource.

5. The method of claim 1, wherein the first duration is a duration for which the first timer is in a running state.

6. A data transmission method, applied to a network device and comprising:
receiving first uplink data transmitted by a terminal device on a first configured grant (CG) resource, wherein the first uplink data contains first information, and the first information is used for identity authentication of the terminal device; and
while a first timer for the terminal device is running, transmitting to the terminal device first downlink control information (DCI) scrambled by a first radio network temporary identifier (RNTI), wherein the first DCI indicates that the terminal device is to retransmit the first uplink data;
receiving the first uplink data retransmitted by the terminal device;
while a first timer for the terminal device is running, receiving second uplink data transmitted by the terminal device on a second CG resource when a first duration elapsed after transmission of the first uplink data, wherein the second uplink data contains the first information, a HARQ process corresponding to the second CG resource is different from a HARQ process corresponding to the first CG resource, and the first duration is a time interval between the first CG resource and the second CG resource.

7. The method of claim 6, wherein receiving the first uplink data retransmitted by the terminal device comprises:
while the first timer is running, receiving the first uplink data retransmitted by the terminal device on a third CG resource; or after expiry of a second timer for the terminal device and while the first timer is running, receiving the first uplink data retransmitted by the terminal device on the third CG resource, wherein a hybrid automatic repeat request (HARQ) process corresponding to the third CG resource is the same as a HARQ process corresponding to the first CG resource.

8. The method of claim 6, wherein receiving, after the first duration elapsed, the second uplink data transmitted by the terminal device on the second CG resource comprises:
while the first timer is running, transmitting to the terminal device second DCI scrambled by a second RNTI, wherein the second DCI indicates that the first uplink data is received successfully by the network device; and
receiving the second uplink data transmitted by the terminal device on the second CG resource.

9. The method of claim 6, wherein the first duration is a duration for which the first timer is in a running state.

10. A terminal device comprising:
a transceiver;
a processor; and
a memory storing programs which, when executed by the processor, are operable with the processor to:
cause the transceiver to transmit first uplink data on a first configured grant (CG) resource, wherein the first uplink data contains first information, and the first information is used for identity authentication of the terminal device;
start a first timer; and
while the first timer is running, cause the transceiver to transmit second uplink data on a second CG resource when a first duration elapsed after transmission of the first uplink data, wherein the second uplink data contains the first information, a HARQ process corresponding to the second CG resource is different from a HARQ process corresponding to the first CG resource, and the first duration is a time interval between the first CG resource and the second CG resource.

11. The terminal device of claim 10, wherein
the transceiver is further configured to:
monitor first downlink control information (DCI) scrambled by a first radio network temporary identifier (RNTI) while the first timer is running, and retransmit the first uplink data in response to receiving the first DCI, wherein the first DCI indicates that the terminal device is to retransmit the first uplink data; and
the processor is further configured to:
restart the first timer after retransmission of the first uplink data.

12. The terminal device of claim 11, wherein the transceiver configured to retransmit the first uplink data is specifically configured to:
retransmit the first uplink data on a third CG resource while the first timer is running, or retransmit the first uplink data on the third CG resource after expiry of a second timer and while the first timer is running, wherein a hybrid automatic repeat request (HARQ) process corresponding to the third CG resource is the same as a HARQ process corresponding to the first CG resource.

13. The terminal device of claim 10, wherein the transceiver configured to transmit the second uplink data on the second CG resource after the first duration elapsed is specifically configured to:
while the first timer is running, monitor second DCI scrambled by a second RNTI, wherein the second DCI indicates that the first uplink data is received successfully by a network device; and stop the first timer in response to receiving the second DCI, and transmit the second uplink data on the second CG resource.

14. The terminal device of claim 10, wherein the first duration is a duration for which the first timer is in a running state.

\* \* \* \* \*